3,046,226
LUBRICATING OIL COMPOSITIONS

Carl L. Sandberg, St. Paul, Paul I. Roth, White Bear Lake, and JoAn M. Mullins, St. Paul, Minn., assignors to Minnesota Mining and Manufacturing Company, St. Paul, Minn., a corporation of Delaware
No Drawing. Filed Feb. 19, 1958, Ser. No. 716,013
3 Claims. (Cl. 252—57)

This invention relates to new and valuable copolymers which, in addition to providing useful adherent surface protective coatings or films, are unexpectedly useful as lubricating oil additives. The invention also relates to lubricating oil compositions containing these copolymers.

Lubricating oils, particularly those used in internal combustion engines such as gasoline engines, diesel engines and the like, tend to become thinner and lose their lubricating efficiency as the engine reaches operating temperatures. Yet, if the oil is too thick initially in the engine, starting of the engine is difficult under even ordinary temperature conditions. Consequently, some compromise in the selection of a particular oil is necessary in the lubricating of engines to the end that the oil will not be so thick at ordinary or low temperatures to prevent or unduly interfere with starting of the engine and which oil will yet not become so thin as to lose its lubricating efficiency as the operating temperatures of the engine are reached. The viscosity index, or V.I. (as determined by ASTM method D567–53) of the oil is usually accepted as a measure of its high temperature performance, the higher the V.I., the better the performance.

Numerous additives have been proposed and are in use which, when added to lubricating oils in minor proportions, serve as viscosity index (V.I.), improvers for the oils to which they are added. The viscosity index, or V.I., determinations are well known in the art and are calculated by a known mathematical relation between the kinematic viscosity of the lubricating oil at 100° F. and at 210° F.

Ideally, a viscosity index improving additive would be one that is oleophobic at some preselected optimum low temperature, e.g., room temperature or below, and that would remain dispersed in the oil without precipitating out and without thickening the oil at these temperatures. As the temperature of the oil increased toward the engine operating temperature, the additive should become progressively more soluble and spread more homogeneously (on the molecular level), through the oil with the temperature rise to stiffen the oil to a degree exactly compensating for the decreased oil viscosity due to the increasing heating as the engine operating temperature is reached. Usually the greater stabilizing effect at any given concentration of additive on the oil is obtained at the expense of thickening the oil at the 100° F. temperature with high molecular weight additives, or by sacrificing some of the possible viscosity index improvement by utilizing a lower molecular weight additive which reduces the initial thickening effect.

While it is sometimes possible to offset the initial thickening effect of the additive in the interest of showing a good viscosity index improvement by substituting a lighter base oil, for example, an SAE 10 oil for an SAE 20 oil, this procedure is often unsatisfactory since the lighter oil contains lower boiling fractions than does the heavier base oil. It is in their ability to narrow this area of compromise that the polymers of this invention are valuable as lubricating oil additives.

Generally, the polymers of this invention are made by the copolymerization of aromatic and aliphatic esters of the same or different ethylene carboxylic acids, the acids being selected from the group containing from 3 to 5 carbon atoms, having molecular weights no greater than about 130 and wherein the ethylenic double bond is conjugated with a carboxyl group. This class of acids may be represented by the structural formula $$X-CH=\overset{Y}{\underset{|}{C}}-COOH$$

wherein X is H, $CH_3$ or COOH, Y is H, $CH_3$, $C_2H_5$ or $CH_2$—COOH, and X and Y are not simultaneously COOH radicals.

Included among this group of acids are acrylic, methacrylic, ethacrylic, itaconic, maleic and fumaric acids.

The preferred acids of this group are those of the acrylic acid series, namely acrylic, methacrylic and ethacrylic acids which may be structurally represented by the formula $$H_2C=\overset{Z}{\underset{|}{C}}-COOH$$

wherein Z is H, $CH_3$ or $C_2H_5$.

These acids and their esters, particularly acrylic and methacrylic acids and esters, readily copolymerize in widely varying proportions. Further, they are commercially available in quantity and considerable literature is available pertaining to their properties, greatly adding to the convenience of their use. Methacrylic acid is a particular preference in the use of these polymers as lube oil additives, since polymers made from esters thereof appear to serve better as pour point depressants than do those of acrylic acid esters.

One of the comonomers is prepared by esterifying one of the above noted group of acids with a saturated aliphatic (which can be alicyclic) primary monohydric alcohol having from 1 to 12 carbon atoms and no more than one other atom in the skeletal structure thereof, the other atom, or hetero-atom, when present, being oxygen and forming an ether linkage with adjacent carbon atoms. Preferred alcohols are the short chain aliphatic alcohols containing from about 1 to about 6 carbon atoms, such as methyl, ethyl, propyl, butyl, 2-ethyl butyl, amyl (amyl alcohol mixtures being readily available as fusel oil), and hexyl alcohols.

The second comonomer is also an ester of an acid (which may be the same as or different from the acid of the first comonomer), selected from the group noted hereinbefore, the acid being esterified with an alkyl-phenyl-ether substituted lower 1,2-alkylene, i.e., ethylene or propylene, glycol having less than four alkylene oxy units in the glycol chain with the alkyl substituent of the alkyl-phenyl-ether group comprising from about 9 to about 18 carbon atoms. These substituted 1,2-alkylene glycols may be represented generally by the structural formula wherein R is an alkyl radical containing from about 8 to about 18 carbon atoms, $R_1$ is a methyl radical or hydrogen and $n$ is an integer from 1 to 3. The preferred monomer is 3-pentadecyl phenoxy-ethyl methacrylate (cardanoxy ethyl-methacrylate).

Structurally, the preferred comonomers may be represented as follows:

(1)
$$A-OOC-\overset{Z}{\underset{|}{C}}=CH_2$$

wherein A is the saturated aliphatic monohydric primary alcohol residue and Z is as previously indicated, namely H or lower alkyl and preferably methyl, and (2)

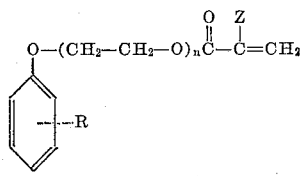

wherein R and Z are both as previously described.

Copolymers of long chain acrylates, such as lauryl, stearyl, cetyl acrylates and alpha-methylacrylates (methacrylates), etc., and short chain acrylates such as ethyl, propyl, butyl, fusel oil acrylates and alpha-methyl-acrylates (methacrylates) etc., have heretofore been successfully employed as lubricating oil additives and indeed, many "multi-grade" lubricating oils contain minor amounts of these copolymers as viscosity index improving agents. They are, however, subject to the deficiencies noted hereinbefore.

It has more recently been discovered that homopolymers of the alkyl-phenoxy alkyl acrylate monomers which form one group of comonomers of the present invention also display viscosity index improving characteristics which are generally comparable to those of the open chain acrylate copolymer commercial additives of the type noted. These homopolymers of aromatic substituted acrylate monomers, however, sacrifice shear stability for significant V.I. improvement and are not useful as pour point depressants of the lubricating oils in which they are incorporated; in some instances they actually increase the pour point of the lubricating oil composition to a point considerably above that of the base lubricating oil.

It has been discovered that the polymers of the present invention are unexpectedly superior in certain fundamental respects as lubricating oil additives to both the copolymers of long and short chain acrylates containing no aromatic substituents and to homopolymers of aromatic substituents and to homopolymers of aromatic substituted acrylates per se.

Thus, it is an important object of this invention to provide new and useful polymers of polymerizable monomeric ethylene carboxylic acid esters of the type described. Another important object is to provide polymers which when incorporated into a lubricating oil have a minimum thickening effect at low temperatures coupled with excellent V.I. improvement at high temperatures, which possess good shear stability, and which further serve to depress the pour points of oils in which they are incorporated. These and other objects which will become apparent as the description proceeds are obtained through the use of these polymers.

One method for the preparation of the alkyl-phenyl-ether substituted lower 1,2-alkylene glycols, and the subsequent esterification of the resulting phenyl substituted alcohol with a polymerizable ethylene carboxylic acid, is described in the following Example I setting forth the preparation of 3-pentadecyl phenoxyethyl acrylate.

EXAMPLE I

A tared, two liter, three neck flask equipped with stirrer, addition funnel and distillation set-up was loaded with 1200 grams (approx. 4 moles) of 3-pentadecyl phenol. Heat was applied thereto to raise the temperature thereof to approximately 60° C. whereupon the 3-pentadecyl phenol was converted to the liquid state. While being maintained at said temperature 40 grams (0.22 mole) of potassium hydroxide in methanol (30% concentration) was added thereto through the addition funnel. Then the mixture was topped in vacuo to 90° C. at 1 mm. of mercury pressure. Then under atmospheric conditions the resultant alkaline mixture was heated to 163° C. and while being maintained at said temperature a stream of ethylene oxide was passed thereinto through a large capillary tube. The ethylene oxide was admitted under the aforesaid conditions over a period of about 2¼ hours whereupon 194 grams (4.4 moles) thereof had become absorbed or reacted with said alkaline mixture. Then the mass was cooled to about 100° C. and neutralized with 15 grams concentrated hydrochloric acid in 15 grams water. This neutral mass was dehydrated at a temperature of 100° C. and 25 mm. of mercury pressure. The dehydrated mass was then filtered at 100–110° C. through a Büchner funnel and the filtrate was recovered. The filtrate was then distilled at 1.5 mm. of mercury pressure in a two liter flask equipped with 2.2 x 30 cm. column filled with metal helices. A yield of 1209 grams of substantially pure beta-(m-pentadecyl phenoxy) ethanol was collected between 222–224° C. in four fractions which had identical melting points of 48.5 to 49.5° C. The percentage of free 3-pentadecyl phenol was determined and found to be less than 0.1%.

The structure of this alkyl-phenyl-ether substituted ethylene glycol may be represented as follows:

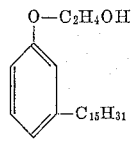

This compound is readily esterified with a member of the acrylic acid series such as acrylic acid or methacrylic acid by reacting the compound in the presence of an acid with acrylate or methacrylate esters thereby forming by transesterification alkyl phenoxy-alkyl acrylic esters having the general formula:

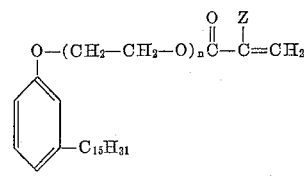

In this particular instance, $n$ has a value of 1, Z is H and the compound may be described as 3-pentadecyl phenoxyethyl acrylate. By virtue of the derivation of the ring compound 3-pentadecyl phenol from cashew nut shell liquid as hydrogenated cardanol, the foregoing compound may be also referred to as cardanoxy-ethyl acrylate. Generically these compounds may be considered as alkyl-phenoxy-alkyl and alkyl phenoxy alkoxy alkyl acrylates.

The corresponding methacrylate has also been prepared as have other similar alkyl-phenoxy terminated acrylates and methacrylates, among them being nonyl-phenoxyethyl acrylate, dodecyl-phenoxyethyl acrylate, and 3-pentadecyl phenoxy propyl acrylate.

A number of alkyl and alkoxy alkyl terminated acrylate comonomers have been obtained either through commerical channels or by laboratory preparation. Among these comonomers were ethyl acrylate, ethoxy ethylacrylate, fusel oil acrylate, ethyl methacrylate, n-butyl methacrylate, n-amyl methacrylate, 2-ethyl-butyl methacrylate and lauryl methacrylate. Since the manner of preparation of these materials is known in the art, a detailed discussion of their preparation is not believed necessary.

Copolymerizing the alkyl-phenoxy terminated acrylates with the alkyl or alkoxyalkyl terminated acrylates results in the production of the copolymers of this invention. In general, these copolymers vary from translucent to transparent waxy materials to light colored rubbery solids. They are soluble in common organic solvents and adhere well to common structural materials such as wood and metal. These features enable the polymers to serve as firmly adherent protective coatings for a wide variety of surfacings; and, their utility in this regard is enhanced by their light stability. Further, when emulsion polymerized they produce dispersions from which water insensitive films can be cast. The general procedure by which the copolymers of this invention are prepared is set forth in the example which follows:

EXAMPLE II

To a mixture of 80 parts by weight of the acrylic acid ester of 3-pentadecylphenoxy-ethyl alcohol and 20 parts by weight of ethyl acrylate in 100 parts by weight of heptane was added 2 parts by weight benzoyl peroxide. The mixture was then heated with slight shaking at 60° C. After 90 hours, the solution of polymer was diluted with 10 parts by weight methanol, the polymer collected, washed and dried. The resulting polymer was a light colored, rubbery material obtained in a yield of about 69%. The polymer was soluble to an extent of more than about 2% by weight in a light mineral oil and possessed an inherent viscosity in benzene of 0.71.

A series of copolymers was prepared by the foregoing procedure with varying proportions of comonomers. In certain cases a 25 or 33% solution in heptane was used rather than the 50% solution noted above. Also, in some instances the temperature of copolymerization was about 55° C. rather than 60° C.

A list of copolymers so prepared is set forth in Table I which follows. In this table, $M_1$ refers to the alkylphenoxy terminated monomer and $M_2$ refers to the alkyl terminated monomer.

*Table I*

| $M_1$ | Abbreviation | $M_2$ | Abbreviation | Range of $M_1$ in mol percent in monomer mixture | Range of combined $M_1$ in mol percent in polymer |
|---|---|---|---|---|---|
| Cardanoxy ethyl acrylate<br>$O-CH_2-CH_2-O-\overset{O}{\underset{\|}{C}}-C=CH_2$<br>(phenyl ring with $-C_{15}H_{31}$) | CA | Ethyl acrylate<br>Fusel oil acrylate<br>Lauryl methacrylate<br>Ethoxyethyl acrylate | EA<br>FOA<br>LMA<br>EEA | 6-83<br>4-59<br>39-66<br>26-40 | 7-80<br>4-65<br>------<br>28-46 |
| Cardanoxy ethyl methacrylate<br>$O-CH_2-CH_2-O-\overset{O}{\underset{\|}{C}}-\overset{CH_3}{\underset{\|}{C}}=CH_2$<br>(phenyl ring with $-C_{15}H_{31}$) | CMA | Ethyl acrylate<br>Ethyl methacrylate<br>n-Butyl methacrylate<br>n-Amyl methacrylate<br>Fusel oil acrylate<br>2-ethyl-butylacrylate<br>2-ethyl-butyl methacrylate<br>Ethoxyethyl acrylate | EA<br>EMA<br>nBMA<br>nAMA<br>FOA<br>2EBA<br>2EBMA<br>EEA | 36-49<br>52<br>25-37<br>27<br>19-51<br>27<br>25-33<br>45-55 | 38-58<br>------<br>17-38<br>35<br>17-46<br>21<br>23-38<br>46-66 |
| Nonyl-phenoxyethyl acrylate<br>$O-CH_2-CH_2-O-\overset{O}{\underset{\|}{C}}-CH=CH_2$<br>(phenyl ring with $-C_9H_{19}$) | N$\phi$EA | Fusel oil acrylate | FOA | 40-80 | ------ |
| Dodecyl-phenoxyethyl acrylate<br>$O-CH_2-CH_2-O-\overset{O}{\underset{\|}{C}}-CH=CH_2$<br>(phenyl ring with $-C_{12}H_{25}$) | D$\phi$A | ----do---- | FOA | 37-78 | ------ |
| Cardanoxy ethoxy ethyl acrylate<br>$O-(CH_2-CH_2-O)_2-\overset{O}{\underset{\|}{C}}-CH=CH_2$<br>(phenyl ring with $-C_{15}H_{31}$) | CEEA | 2-ethyl-butyl acrylate | 2EBA | 90 | ------ |
| Cardanoxy propyl acrylate<br>$O-CH_2-\overset{CH_3}{\underset{\|}{CH}}-O-\overset{O}{\underset{\|}{C}}-CH=CH_2$<br>(phenyl ring with $-C_{15}H_{31}$) | CPA | Fusel oil acrylate | FOA | 50 | ------ |

The polymerization rates of the monomers are reasonably close and is reflected in Table I by comparing mol percent of $M_1$ in the polymerization mixture with the combined mol percent of $M_1$ in the final polymer.

Polymerization occurs across the double bonds of the ethylenic residues of the starting acids so that the skeletal backbone of the polymer is composed of carbon to carbon bonds only, with the other substituents depending from this backbone as a side chain. The most useful copolymers, from the standpoint of their performance as lubricating oil additives, are those wherein the alkylphenyl terminated monomer is present in its polymeric combined form in the polymer in amounts of about 20 to about 95 mol percent of the polymer. Also, particularly in paraffin or waxy base oils, the polymer should have terminal alkyl groups in the side chain thereof having an average chain length of from about 6.5 to about 10 carbon atoms. By "terminal alkyl group" is meant either R, the alkyl group attached to the phenyl ring, or A, the alkyl (or alkoxyalkyl), group comprising the residue of the saturated monohydric primary alcohol, in the preferred monomer mixture.

When the average chain length of the terminal alkyl groups in the polymer is less than about 6.5, the polymer precipitates out of the base oil. When the chain length average exceeds about 10, the polymer loses its high temperature thickening efficiency. In naphthenic or aromatic base oils, however, the average terminal alkyl group chain length of the polymer can be as low as about 5.5 without precipitating out of the oil.

The most useful alkyl and alkoxy-alkyl acrylates and methacrylates are those containing about 6 carbons and less in the alkyl or alkoxy alkyl group, i.e., hexyl (and below), acrylates and methacrylates. As the number of carbon atoms in the alkyl chain is increased above about 6 carbon atoms in the alkyl acrylate comonomer, the resulting polymers tend to become more soluble in the base oil and evidence a corresponding decrease in viscosity index improvement over those polymers utilizing the shorter chain alkyl acrylates.

In the characterization of polymeric materials of the type herein involved, it is convenient to describe the degree of polymerization or molecular weight of the material since this value provides a comparative index of performance of different polymers as V.I. improvers.

A convenient method for obtaining a rough estimate of the molecular weight is through determinations of the inherent viscosities of the polymers. The inherent viscosity is a function of the molecular weight and is represented as $[\eta]$. This value may be determined by the relation of viscosities defined by the following expression:

$$[\eta] = \frac{\ln \frac{(\eta \text{ solution})}{(\eta \text{ solvent})}}{C}$$

wherein C is a concentration in grams of polymer per 100 ml. of solvent and "$\eta$ solution" and "$\eta$ solvent" are the viscosities in any consistent units, of the solution and the solvent. In determining the inherent viscosities of the polymers hereinbefore and hereinafter identified, the solvent is benzene and the concentration of polymer in solution is 0.2 gram polymer per 100 ml. solvent.

The inherent viscosity may be considered for purposes of this case as a measure of the bulkiness of the polymer in solution. For the polymer to be effective as a lubricating oil additive, its bulkiness as determined by its inherent viscosity in the oil, should increase with increasing temperatures and provide a ratio between inherent viscosities at a higher and a lower base temperature greater than unity. For practical measurements in lubricating oil composition, temperatures of 100° and 210° F. have been chosen as the low and high base temperatures so that molecular weight comparisons ($\eta$ in benzene), as well as the effective increase in the bulk of the polymeric solute can be correlated with the viscosity index improvement. This comparison may be made by comparing the viscosity ratio (V.R.), which may be defined as:

$$\text{V.R.} = \frac{[\eta]\, 210°\ \text{F.}}{[\eta]\, 100°\ \text{F.}}$$

with the V.I. of the lube oil composition. In the calculation of V.R. the inherent viscosities at the high and low temperatures are determined from viscosity measurements of 2% solutions of the polymer in the base lubricating oil. This comparison more adequately reflects the actual thickening effect of the polymer in the oil at high temperatures than does the V.I.

To determine the effectiveness of these new copolymers as viscosity index improvers, they were incorporated into various base oils in amounts equaling about 2% by weight of the resulting solution. Also, commercial additives were similarly incorporated into the same base oils in the same amounts, and the resulting lubricating oil compositions compared with one another and with the base oils without any additives therein.

The base oil designated as base oil #5 in Table II following is a light, highly refined Pennsylvania type mineral oil composed essentially of a mixture of paraffins.

Table II

| Identification | Copolymer M1 | Copolymer M2 | Mol percent combined M1 | [η] in benzene | Kinematic viscosity at 100° F. (centistokes) | Viscosity index | Viscosity ratio | Terminal chain length (average) |
|---|---|---|---|---|---|---|---|---|
| A | (1) | (1) | | | 17.93 | 111 | | |
| B | Comm.2 | Add. A | | 0.61 | 29.32 | 167 | 1.19 | |
| C | Comm.2 | Add. B | | 0.98 | 34.28 | 166 | 1.19 | |
| 1 | Comm.2 | Add. C | | 1.40 | 47.07 | 164 | 1.18 | |
| 2 | CMA | 2EBMA | 38 | 0.42 | 22.96 | 168 | 1.43 | 9.4 |
| 3 | NΦEA | FOA | 41 | 0.41 | 23.88 | 168 | 1.63 | 6.6 |
| D | CMA | FOA | 55 | 0.70 | 28.02 | 171 | 1.31 | 10.5 |
| 4 | Comm.2 | Add. D | | 1.15 | 34.07 | 177 | 1.33 | |
| 5 | CA | EEA | 46 | 0.73 | 21.51 | 174 | 1.78 | 9.6 |
| 6 | CMA | FOA | 22 | 0.83 | 27.89 | 175 | 1.43 | 7.2 |
| 7 | CMA | nAMA | 35 | 0.54 | 22.91 | 176 | 1.71 | 8.5 |
| 8 | CMA | FOA | 29 | 1.32 | 30.09 | 176 | 1.56 | 7.9 |
| 9 | CMA | EA | 38 | 0.78 | 23.50 | 178 | 1.72 | 6.9 |
| 10 | CA | FOA | 27 | 0.55 | 26.21 | 179 | 1.59 | 7.8 |
| 11 | CA | FOA | 20 | 0.54 | 26.21 | 179 | 1.59 | 7.0 |
| 12 | CMA | EEA | 46 | 1.42 | 27.54 | 183 | 1.98 | 9.6 |
| 13 | CA | LMA | 78 | 0.21 | 21.94 | 149 | 1.09 | 14.3 |
| 14 | CA | LMA | 49 | 0.27 | 23.85 | 151 | 1.02 | 13.5 |

1 Base oil #5.
2 All of these comprise copolymers of long and short chain methacrylates, generally principally of lauryl and n-butyl methacrylates.

Significantly, copolymers 1–10 display equivalent or better viscosity index improvement than do the commercial additives while invariably possessing a lesser thickening effect on the base oil at the 100° F. base temperature for additives of the same [η] range. Perhaps even more revealing is a comparison of the comparable molecular weight materials, as evidenced by commercial additive C, which has an inherent viscosity of 1.40 in benzene as compared with copolymers 7 and 11 having respective inherent viscosities of 1.32 and 1.42. The commercial additive increased the kinematic viscosity of the base oil approximately 29 centistokes at 100° F., whereas copolymer number 7 increased it only 12 centistokes and copolymer number 11 only 10 centistokes while bettering the viscosity index improvement of the commercial additive by 12 and 19 V.I. units respectively.

This unexpected superiority of these new copolymers is also reflected in the viscosity ratio of the three additives having corresponding inherent viscosities. Thus, where commercial additive C displays a viscosity ratio of 1.18, copolymers 7 and 11 display viscosity ratios of 1.56 and 1.98 respectively, indicating that whereas at the increased temperatures applicants' copolymers have increased in bulkiness from more than one and a half to nearly two times their original bulk, the bulkiness of the commercial additive remains relatively unchanged. It would appear that the V.I. improvement of the commercial additive is more dependent upon its initial thickening effect on the base oil than are the polymers of this invention.

As can be seen, the last two members, 12 and 13, of Table II, are much less effective than the other copolymers of the series, as viscosity index improvers. As has been noted hereinbefore, when utilized as lubricating oil additives, the preferred copolymers are those having terminal alkyl groups in the side chain thereof with an average chain length of about 6.5–10.0 carbon atoms. In the two copolymers noted the average terminal chain length is over 12 and their performance is poor.

In Table III following, the oil designated "base oil #9," is a highly refined Mid-Continent oil useful as a light lubricating oil for automobile engines.

additive in the oil at the lower 100° F. temperature which is not reflected in V.I. values. Comparing the V.R. values of copolymers 6 and 8 also bears out the relation of low temperature thickening to high temperature stiffening. Thus, where 8 displayed the higher V.I., it displayed the lower V.R. value, indicating the obtaining of a high V.I. at the expense of high initial oil thickening at the base temperature.

The polymers selected for comparison in this Table III with additives A, B and C were selected on the basis that they encompassed the range of molecular weight materials covered by the commercial additives. Similar results were obtained in comparing these polymers with laboratory prepared polymers of lauryl methacrylate-ethyl methacrylate (57:43); lauryl methacrylate-n-butyl methacrylate (51:49); and lauryl methacrylate-ethoxy ethyl acrylate (58:42); the parenthetical proportions being molar ratios of combined monomers in the polymer.

Since the function of an additive as a viscosity index improver bears no relation to its function as a pour point depressant for the oil into which it is incorporated, comparative tests were run on a de-waxed light mineral oil having a kinematic viscosity at 100° F. of 9.56 centistokes, a viscosity index of 87 and a normal pour point of −80° F.

Into one sample of this oil was incorporated 2% by weight cardanoxy-ethyl acrylate homopolymer; into a second sample was incorporated 2% by weight of a copolymer of cardanoxy-ethyl acrylate and fusel oil acrylate (42:58) and into a third sample was incorporated 2% by weight of commercial additive A. The sample into which the homopolymer had been incorporated now displayed a pour point of +5° F. whereas the samples into which the copolymer and the commercial additive had been incorporated displayed respectively pour points of −75° F. and −76° F.

In a conventional automobile lubricating oil having an SAE-10 designation possessing a kinematic viscosity at 100° F. of 73.50 centistokes and a normal pour point of 15° F., the cardanoxy-ethyl acrylate-fusel oil acrylate copolymer when incorporated thereinto in an amount of 2% by weight was found to decrease the pour point to

*Table III*

| Copolymer No. (from Table II) | Copolymer | | Mol percent $M_1$ | [η] in benzene | Kinematic viscosity at 100° F. | Viscosity index | Viscosity ratio |
|---|---|---|---|---|---|---|---|
| | $M_1$ | $M_2$ | | | | | |
| | (1) | (1) | | | 32.60 | 100 | |
| 6 | CMA | n-AMA | 35 | 0.54 | 41.78 | 147 | 1.64 |
| 8 | CMA | EA | 38 | 0.78 | 50.78 | 156 | 1.59 |
| 11 | CMA | EEA | 46 | 1.42 | 62.40 | 161 | 1.78 |
| A | A | A | | 0.61 | 53.49 | 143 | 1.17 |
| B | B | B | | 0.98 | 60.26 | 147 | 1.20 |
| C | C | C | | 1.15 | 58.29 | 152 | 1.34 |

¹ Base oil #9.

The lubricating oil compositions of Table III correspond to automobile engine multi-grade lubricating oils of SAE 10W-20.

As is apparent, copolymers 6, 8 and 11 display a greater increase in bulkiness, evidenced by the higher viscosity ratios, than do the commercial additives. The practical effect of this increase is evidenced in the 100° F. viscosity column as compared to the viscosity improvement. Thus, copolymer #6 increased the 100° F. oil viscosity only about 9 centistokes while increasing the V.I. improvement, had a poor V.R. (1.20), which re- also increased the V.I. by 47 points, increased the 100° F. oil viscosity about 27 centistokes. This difference is predicted by the viscosity ratios of the respective additives, thus, additive B, which displayed relatively good V.I. improvemnet, had a poor V.R. (1.20), which reflected the undesirable initial thickening effect of the −20° F., a reduction in degree that equalled that provided by commercial additive A.

Further, the advantages provided by these new copolymers in the area of high temperature thickening effects on base oils in which they are incorporated are gained at no loss of shear stability. In fact, for the same V.I. improvement as provided by a commercial additive of the type herein compared, a more shear stable, i.e., lower molecular weight, polymer of this invention may be used. It follows, that for the same shear stability, the polymer of this invention will provide a higher V.I. than its comparable commercial additive.

The polymers of this invention may be usefully incorporated into lubricating oils in amounts of from about 1/10 of 1% to about 10% by weight, and preferably not over about 5% by weight. For purposes of facilitating incorporation into the base lubricating oils, the polymers may be marketed or stored in concentrations up to about 30 or 40% by weight in the base oil. The base oil may also have added thereto, emulsion inhibitors, stabilizers, detergents and/or other additives as may be found to be desirable or customary.

It is to be understood that the foregoing examples and tables are not to be interpreted as limiting the scope of the invention and that the acrylate and methacrylate copolymers, while forming a preferred group, may be replaced in whole or in part with esters of the other acids noted hereinbefore to provide useful copolymers.

What is claimed is:

1. A lubricating oil containing from about 0.1 to about 10% by weight of a copolymer of monomeric esters of polymerizable ethylene carboxylic acids selected from the group consisting of acrylic and methacrylic acid, (1) one of said acids being esterified with a saturated primary monohydric alcohol having from about 1 to about 6 carbon atoms and no more than one other atom in the skeletal structure thereof, said other atom when present being oxygen and forming an ether linkage with adjacent carbons, (2) the other of said acids being esterified with an alkyl-phenyl-ether substituted ethylene glycol having less than four ethylene oxy units in the glycol chain, the alkyl substituent of said alkyl-phenyl-ether group comprising from about 9 to about 18 carbon atoms, said copolymer comprising between about 20 and about 90 mol percent (2) and having a terminal alkyl group in the side chain thereof having an average chain length of about 6.5–10.0 carbon atoms.

2. A lubricating oil containing from about 0.1 to about 10% by weight of a copolymer of monomeric esters of polymerizable ethylene carboxylic acids containing from 3 to 5 carbon atoms and having molecular weights no greater than about 130 and wherein the ethylenic double bond is conjugated with a carboxyl group, (1) one of said acids being esterified with a saturated primary monohydric alcohol having from 1 to 12 carbon atoms and no more than one other atom in the skeletal structure thereof, said other atom when present being oxygen, (2) the other of said acids being esterified with an alkyl-phenyl-ether substituted lower 1,2-alkylene glycol having less than four alkylene oxy units in the glycol chain, the alkyl substituent of said alkyl-phenyl-ether group comprising from about 9 to about 18 carbon atoms, said copolymer comprising between about 20 and about 95 mol percent (2) and having a terminal alkyl group in the side chain thereof having an average chain length of about 5.5–10.0 carbon atoms.

3. The lubricating oil of claim 2 wherein said polymerizable ethylene carboxylic acids are selected from the group consisting of acrylic and methacrylic acid.

References Cited in the file of this patent

UNITED STATES PATENTS

| | | |
|---|---|---|
| 2,426,852 | Wright | Sept. 2, 1947 |
| 2,516,064 | Marks | July 18, 1950 |
| 2,517,127 | Meitzner | Aug. 1, 1950 |
| 2,541,126 | Swern et al. | Feb. 13, 1951 |
| 2,604,453 | Popkin | July 22, 1952 |
| 2,615,845 | Lippincott et al. | Oct. 28, 1952 |
| 2,637,698 | Tutwiler | Mar. 5, 1953 |
| 2,892,818 | Lowe et al. | June 30, 1959 |

FOREIGN PATENTS

| | | |
|---|---|---|
| 761,897 | Great Britain | Nov. 21, 1956 |

UNITED STATES PATENT OFFICE
CERTIFICATE OF CORRECTION

Patent No. 3,046,226                                    July 24, 1962

Carl L. Sandberg et al.

It is hereby certified that error appears in the above numbered patent requiring correction and that the said Letters Patent should read as corrected below.

Column 9, line 69, strike out "V.I. improvement, had a poor V.R. (1.20), which re-" and insert instead -- V.I. by 47 points, while commercial additive B, which --.

Signed and sealed this 26th day of March 1963.

(SEAL)
Attest:

ESTON G. JOHNSON                                DAVID L. LADD
Attesting Officer                                   Commissioner of Patents